United States Patent [19]

Kravitz

[11] 4,021,937

[45] May 10, 1977

[54] EDUCATIONAL GAME APPARATUS

[76] Inventor: Margery Dena Kravitz, 42 Massapoag Ave., Sharon, Mass. 02067

[22] Filed: Sept. 2, 1975

[21] Appl. No.: 609,379

[52] U.S. Cl. ............................................. 35/35 H
[51] Int. Cl.² .......................................... G09B 1/04
[58] Field of Search ........................... 35/35 H, 73

[56] References Cited

UNITED STATES PATENTS

| | | | |
|---|---|---|---|
| 2,586,039 | 2/1952 | Heggedal | 35/73 UX |
| 2,929,160 | 3/1960 | Lyttle | 35/73 |
| 3,197,891 | 8/1965 | Pierce | 35/35 H |
| 3,270,430 | 9/1966 | Hurst | 35/35 H |
| 3,520,072 | 7/1970 | Greenwood | 35/35 H |

FOREIGN PATENTS OR APPLICATIONS

| | | | |
|---|---|---|---|
| 491,948 | 4/1953 | Canada | 35/35 H |
| 141,053 | 3/1921 | United Kingdom | 35/35 H |

Primary Examiner—William H. Grieb
Attorney, Agent, or Firm—William Nitkin

[57] ABSTRACT

An educational game apparatus to improve a player's sight reading, sentence composition and parsing skills comprised of a plurality of distinct game boards, each having columns and rows of frames imprinted with language elements. When the instructor selects a planar member upon which is imprinted a language element from a container of said members, the player places a marker upon the frame on his board imprinted with the selected language element. When the markers on a player's game board form a preselected configuration, the selection process ends and the players then compose and parse sentences in order to score points.

2 Claims, 4 Drawing Figures

MASTER BOARD

| FREE AND FREE | CAUGHT | INTO THE HOUSE | SALLY | THREW THE BALL |
|---|---|---|---|---|
| ANXIOUSLY | COLD MILK | IS | SAW | TO BUY |
| ARE | DISAPPEARED | JOHN | SCAMPERED | TO GO |
| ASKED | EATING | MANY | SHE | TO SEE |
| ATE | FRESH AIR | ME | SHOUTED | TO SWIM |
| BECAME ILL | HER PARENTS | ONTO THE GROUND | SWIMMING | TO THE STORE |
| BEHIND THE BARN | HIM | POPCORN | TEN CUPCAKES | WATCHED A MOVIE |
| BICYCLED | RED | PLEASE TAKE | THE PLAYFUL PUP | WHILE JUMPING |
| FREE BUT FREE | IF | RUSHED | THE RED BALL | WHILE WALKING |
| BY THE LAKE | IF YOU GO | QUIKCLY | THEY | WITH YOU |

30     FIG. 3     32

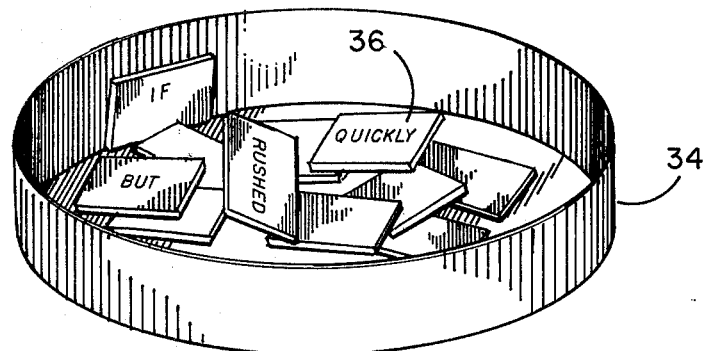

FIG. 4

EDUCATIONAL GAME APPARATUS

FIELD OF THE INVENTION

The present invention resides in the field of educational games and more particularly relates to a game played on a game board which improves a player's sight reading, sentence composition, and parsing skills.

PRIOR HISTORY

It has been found that when teaching students subjects which might otherwise be tedious and boring, attention-getting devices such as competitive games incorporating both skill and chance are helpful. Such games create an initial interest in the subject matter, and the student is able to absorb the subject matter more effortlessly than by repetitive drilling techniques.

There are many games in the area of this invention that involve word recognition and problem-solving skills. Many of these games have the drawback in that they are games of chance and do not require study, thought or creativity on the part of the player. Other games require only skill and the less intelligent student may lose interest in the game if he feels he has no chance of winning. The game I have invented combines both elements of chance and skill to interest a wide group of students. This game can also be adapted to suit the skill level of the players. For the young player sight reading skills and simple sentence composition can be stressed. For the advance player, sentence composition, recognition of parts of speech and parsing can be stressed. For the player learning a foreign language, this game can be used with foreign language elements substituted for English language elements.

There are several other games in the general category of my invention which incorporate game boards, some dealing with the location of correct answers on a game board and other dealing with the recognition of individual words on a game board. The present invention differs from the above games in that there are no specific answers per se. To score points a player must be able to sight read language elements, combine these language elements to form grammatically correct sentences and correctly parse his sentences. Additional points may be scored by a player if the markers on his game board form a preselected configuration.

SUMMARY

The present invention is an educational game played on a game board which improves a player's sight reading, sentence composition and parsing skills. Each game board is divided into 25 frames and within each frame is a language element which may be a word, word phrase or sentence component such as a noun, verb, prepositional phrase, infinitive phrase, clause, etc. An important feature of the game board is that each language element containing two or more words is printed on a single line. The player becomes accustomed to seeing word phrases as a single unit and thereby improves his sight reading skills. These frames form five rows and five columns. Each player is equipped with one or more game boards, numerous markers, paper and a pencil. These markers may be in the form of colored transparent rectangles so that when a player places a marker over a frame on his game board, he can still read the language element beneath the marker. The instructor calls out the language element randomly drawn from a pool of all the language elements appearing on the game boards. The player places a marker over the particular language element called out if it appears on his board. The instructor then places the randomly drawn planar member on which is printed the language element called out onto its respective position on the master board. Printed on the master board are all the language elements contained in the pool. The instructor is thus able to recognize quickly what language elements have been called out when judging the correctness of sentences composed by the players. There are many possible arrangements for the language elements printed on the master board. Two possible arrangements would be an alphabetical arrangement and an arrangement according to the part of speech of each language element. The instructor at the beginning of the game indicates a particular pattern or configuration of markers, described below, on a game board which, if achieved by a player, constitutes the end of the calling out of language elements. The first player achieving the desired pattern and calling out LANGU to indicate his completion of the desired pattern will score five points. At this point in the game the instructor will cease to call out language elements. From the language elements covered by markers on his game board, each player must form sentences using at least two marked language elements. The more complex the sentence, i. e., the more marked language elements that can be incorporated into one sentence, the more points a player will score. Each marked frame on the game board can be used only once.

Scoring is based on the following rules. The player achieving LANGU earns five points. A sentence composed of two marked frames is worth two points. A sentence composed of three marked frames is worth five points. A sentence composed of four or more marked frames is worth seven points plus three additional points for each marked frame over four. A player will receive an additional two points for correctly parsing all the sentences he forms. On the paper provided, the player may jot down his sentences and score himself. Thus the player achieving LANGU is not necessarily the winner or high scorer of the game.

The game board may contain an optional center frame designated as a "FREE" frame in which may be a connective word, such as "and" or "but". The decision as to whether this frame may be used once or many times in forming sentences is left to the discretion of the instructor. The instructor may vary the game by announcing that all nouns on the players' game boards are "FREE". A player may then place a marker on all the noun sentence components that he can recognize on his board. Other groups of sentence components, such as verbs, prepositional phrases, etc. may also be designated "FREE".

The instructor's choice of a LANGU pattern will, to some extent, determine the length of the game and the number of language elements needed to be called out before a player achieves LANGU. The following are some of the LANGU patterns. A Regular LANGU is formed by markers in a line in any direction. A Diagonal LANGU is formed by markers in a diagonal line in either direction. A Vertical LANGU is formed by markers in a particular column. A Horizontal LANGU is formed by markers in a particular row. A letter "H" LANGU is formed by markers in the first and fifth columns in combination with markers in the center row. An Arrow LANGU is formed by markers in a diagonal line in combination with a corner square of four frames at either end of the diagonal line. A Postage Stamp LANGU is comprised of markers in a four-frame square at either corner of the game board. A Double Postage Stamp LANGU is formed by markers in two four-frame squares at the corners of the game board. A Letter "L" LANGU is formed by markers in a vertical and horizontal line which form an L-shaped configuration. An Outside Picture Frame LANGU is formed by markers in all the frames forming the perimeter of the game board. A Letter "X" LANGU is formed by markers in two diagonal lines. A Wild Card LANGU is formed by the combination of markers in one row and one column. An Inside Square LANGU is formed by the markers in the frames surrounding the center frame of the game board.

A variation of the above game is where a frame containing a particular language element is colored to signify its use in a sentence. For example a frame colored red might indicate the frame contains a noun. A frame colored blue might indicate the frame contains a verb. The use of colored frames would aid a player in identifying a language element's use in a sentence.

Another variation of the above game is where the language elements are in a foreign language to assist in teaching that language to students. One aspect of this variation is where the instructor calls out language elements in English and the player must be able to recognize the corresponding language element in the foreign language on his game board in order to place a marker over the corresponding frame.

Another embodiment of the above game varies the structure and surface of the game board. In this variation, the surface of the game board is of a smooth plastic material on which are printed various language elements within its frames. Placed on top of each frame is a plastic film of a slightly smaller size than the frame and which is attracted to and adheres to the frame by electrostatic attraction or equivalent. On the film's surface is printed the same language element that appears on the frame of the game board below. In place of a pad of paper with which to form sentences, the player can be equipped with a plastic-surfaced composition board to which the plastic films can adhere. When the sentence composition part of the game begins, a player forms sentences on this composition board by peeling the plastic films from the game board and arranging them on the composition board. When the game is over, the player repositions the plastic films over the appropriate frames on the game board. The frame borders may be elevated to assist in repositioning the plastic films neatly over their respective frames and to assist in keeping markers on frames should the game board be jostled.

BRIEF DESCRIPTION OF THE DRAWING

FIG. 3 illustrates a typical master board.
FIG. 4 illustrates planar members in a container.

DESCRIPTION OF THE PREFERRED EMBODIMENT

Figures 1, 2:
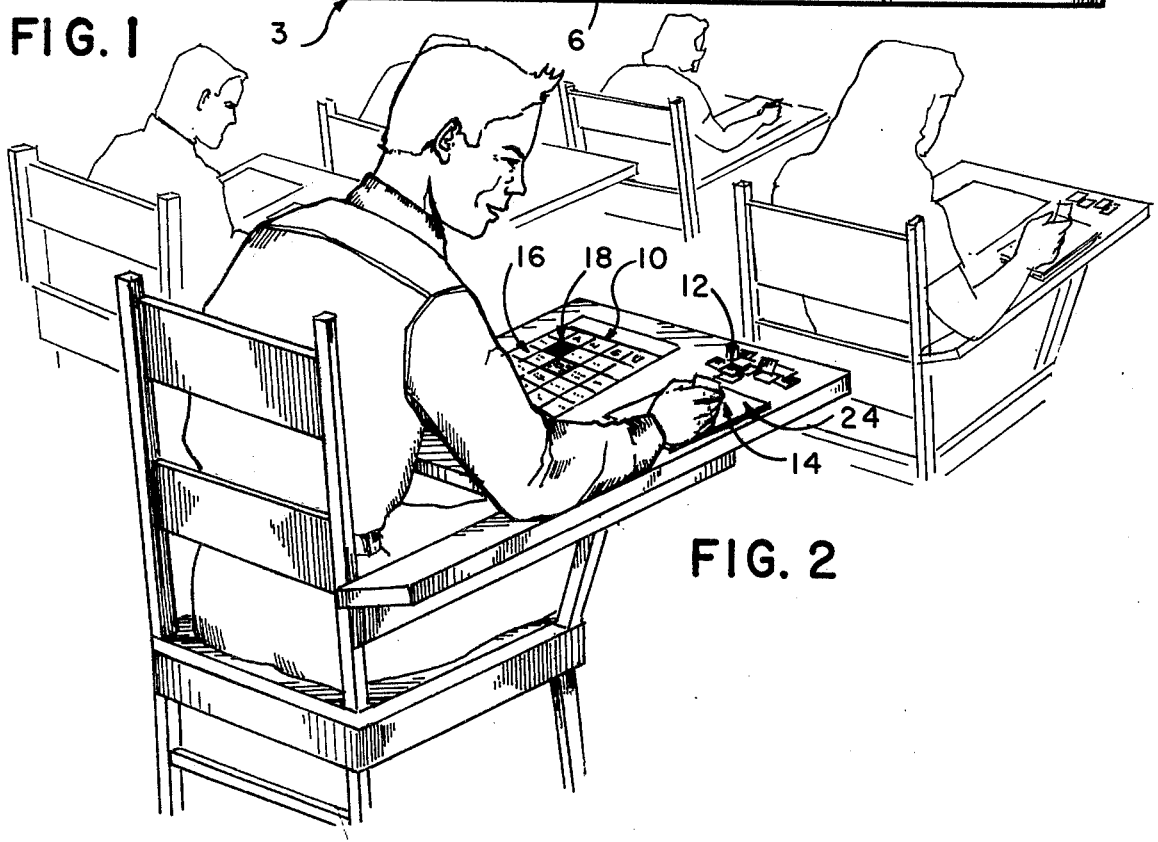
FIG. 1 illustrates a typical game board.
FIG. 2 illustrates a player in a classroom setting with game board apparatus on his desk.

FIG. 1 depicts a typical game board 3 to be used when playing this game with a single frame indicated by 6. The fact that each game board contains a different arrangement of language elements adds a further element of chance to the game.

To illustrate how this game is played using the game board illustrated in FIG. 1, let us assume that the pattern constituting LANGU is an Outside Picture Frame and that the player using this game board has covered the outer perimeter of frames with markers and thereby achieves LANGU. The player of this game board is likely also to have other frames on the game board covered by markers and these, too, may be used to form sentences. Let us assume for the sake of example that only the outer perimeter of frames is covered by markers. One player of this game board would earn an initial five points for achieving LANGU and he would score 19 points by forming the following three sentences using a total of twelve frames.

|    |                                           | Points |
|----|-------------------------------------------|--------|
| 1. | While walking, Sally became ill by the lake. | 7      |
| 2. | John rushed to the store.                 | 5      |
| 3. | She saw him with you.                     | 7      |
|    |                                           | 19     |

By correctly parsing each sentence, this player would earn two additional points, giving him a total of 26 points.

Another player possessing greater sentence composition skill might form the following single sentence:
 1. While walking to the store, she saw John and Sally eating by the lake.
This player, in addition to earning five points for achieving LANGU, would score 22 points by combining nine frames. If he correctly parsed this sentence he would earn an additional two points, giving him a total of 29 points.

Further shown in FIG. 1 is removable plastic film 20 partially lifted from the game board's surface.

FIG. 2 illustrates a player in a classroom setting at his desk on which is game board 10 containing 25 frames, one of which is frame 16 and plurality of markers 12. A marker has been placed on the game board and this marked frame is indicated by 18. In an alternative embodiment of this game apparatus, the player may position the removable plastic film 14 onto plasticized composition board 24 and arrange these plastic films to form sentences. These plastic films can be rearranged easily to allow a player to form many sentences and select the highest scoring sentence.

An additional refinement that can be incorporated with the use of plastic films is the elevation of the frame borders. Elevated frame border 22 in FIG. 1 will assist in the positioning of the plastic films neatly over their respective frames, the raised border acting as a positioning guide. The elevated frame border will also assist in keeping a marker over a frame should the game board be jostled. In playing the game, a player may choose to leave his markers over the frames containing the selected language element while the selection process is carried on and begin arranging the plastic films on the composition board to compose high-scoring sentences.

FIG. 3 illustrates a typical master board 30 on which is printed every distinct language element appearing on the game boards. FIG. 4 depicts planar member 36 which is randomly drawn from container 34 containing a plurality of planar members on each of which is printed one distinct language element that appears on the game boards and master board. After the language element printed on a planar member has been called out by the instructor, the instructor then places that planar member illustrated by planar member 32 in FIG. 3 onto the appropriate frame of master board 30 imprinted with the same language element. The language elements printed on master board 30 are arranged alphabetically in this embodiment.

What I claim is:

1. An educational game apparatus to improve a player's sight reading, sentence composition, and parsing skills comprising in combination:

a plurality of game boards, each having a plasticized upper surface and each having designated thereon a plurality of adjoining columns and a plurality of perpendicularly intersecting adjoining rows defining a plurality of frames, and a plurality of language elements printed within said frames, each frame imprinted with a distinct language element, all words of said language elements being on the same line, one of said frames located in the center of each game board being designated as a "free" frame and containing a connective language element therein;

a plurality of planar members, each having imprinted thereon a distinct language element, said plurality of planar members forming a pool from which language elements are selected at random;

a master board for use by an instructor for arrangement thereon of said planar members after they have been randomly selected;

a container for holding said plurality of planar members from which they are randomly selected;

a plurality of markers, one of which is to be placed over a frame on said game boards corresponding to the language element on said planar member selected at random from said container, said game continuing until a player has formed with said markers on his game board a preselected pattern of markers, said language elements beneath said markers to be arranged into sentences utilizing two or more of said language elements, the winning player being determined by the number and complexity of sentences so constructed;

a plurality of rectangular plastic films, each removably positioned upon each of said frames, each imprinted with the same language element imprinted on the frame beneath it, said plastic films adhering to said game boards' plasticized surface when placed theron;

a plurality of composition boards, one utilized in conjunction with each of said game boards, each of said composition boards having a plasticized surface upon which said plastic films can be removably positioned and arranged to form sentences; and elevated borders around each frame on each of said game boards to assist in the repositioning of said plastic films and to prevent accidental movement of said plastic films when said plastic films are in position on their respective frames of said game boards.

2. An apparatus as recited in claim 1 wherein each of said plurality of markers is transparent to allow viewing of the language element beneath it.

* * * * *